United States Patent Office 3,312,672
Patented Apr. 4, 1967

3,312,672
ACCELERATING VULCANIZATION OF RUBBER WITH AMINOALKYL HALOPHENYL SULFIDES
Kamal Naguib Ayad, Wrexham, Wales, assignor to Monsanto Chemicals Limited, London S.W. 1, England, a British company
No Drawing. Filed Nov. 8, 1962, Ser. No. 236,441
Claims priority, application Great Britain, Nov. 23, 1961, 41,951/61
8 Claims. (Cl. 260—79.5)

This invention relates to a process for the vulcanization of rubber using as vulcanization accelerators a certain class of materials that includes some that are new chemical compounds.

In its most usual form the vulcanization of rubber is essentially a reaction between the rubber and sulfur or a sulfur-containing material. For many years it has been the usual practice in the rubber industry to carry out the process in the presence of a further substance, termed a vulcanization accelerator, capable of accelerating this reaction. In recent times, with the use in the rubber industry of mixers operating at high temperatures, as well as the introduction of newer types of carbon black, the requirements for a successful vulcanization accelerator have become progressively more exacting.

It has now been found that certain aminoaliphatic halophenyl sulfides possess these requirements to an outstanding degree. The compounds also have antioxidant properties.

Accordingly, the present invention comprises a process for the vulcanization of rubber, in which an aminoaliphatic halophenyl sulfide in which the phenyl nucleus contains from three to five halogen atoms is incorporated into unvulcanized rubber together with sulfur or a sulfur-containing agent, and the mixture is heated to effect vulcanization. A typical accelerator is, for instance, diethylaminomethyl pentachlorophenyl sulfide.

Also part of the invention is a composition comprising rubber and an aminoaliphatic halophenyl sulfide in which the phenyl nucleus contains from three to five halogen atoms.

The aminoaliphatic halophenyl sulfides which can be used as accelerators include certain members which are new chemical compounds and as such form part of the invention. The new compounds are amino and aliphatic aminomethyl halophenyl mono-sulfides in which the phenyl nucleus contains from three to five halogen atoms. The invention further includes a process for the production of a new compound of the invention, in which a halothiophenol having from three to five halogen atoms in the thiophenol nucleus is reacted, optionally in stages, with an amine and formaldehyde.

The halogen atoms of the halophenyl nucleus of the aminoaliphatic halophenyl sulfide (including those members that are new compounds) can each be for example fluorine, chlorine or bromine. The preferred halogen is usually chlorine.

Generally the aminoaliphatic halophenyl sulfide that is incorporated in rubber is a monosulfide, but it can be one where the aminoaliphatic group is linked to the halophenyl group through a chain of two or more sulfur atoms.

The aminoaliphatic halophenyl sulfides include those where more than one aminoaliphatic group is linked through sulfur to a halophenyl nucleus, for instance the bis(aminomethylthio)halobenzenes, and those derived from polyamines, for instance the N,N'-bis(halophenylthiomethyl)diamines.

In the aminoaliphatic halophenyl sulfide the aliphatic group can be, for instance, an alkyl group, such as a methyl, ethyl, butyl or octyl group, a cycloalkyl group, such as a cyclopentyl or cyclohexyl group, or an aralkyl group, such as a benzyl group. Preferably the aliphatic group is a lower alkyl group, for instance one of not more than four carbon atoms, having either a straight or branched chain, for example a methyl, ethyl, propyl, isopropyl, n-butyl or s-butyl group. Very good results are obtained with the aminomethyl halophenyl sulfides.

The amino group of the aminoaliphatic aromatic sulfide can be a primary amino group —$NH_2$, but is more usually a secondary amino group —NHR or a tertiary amino group —NRR'. The groups R and R' can each be aliphatic or aromatic or, in the group —NRR', can together form a ring with the nitrogen atom.

When aliphatic, the group R or R' can be for instance any of those from which the aliphatic group of the aminoaliphatic halophenyl sulfide, as exemplified above, can be selected. When aromatic, R or R' can be for instance an aryl group, such as a phenyl, tolyl or naphthyl group.

Where R and R' form a ring with the nitrogen atom it can be, for instance, a pyrrolidine, piperidine, hexamethyleneimine or morpholine ring including lower alkyl derivatives thereof. Where the aminoaliphatic halophenyl sulfide is one derived from a polyamine, the group R or R' is a polyvalent group, and when aliphatic can be, for example, an alkylene group, such as an ethylene or butylene group, when the polyamine can be, for instance, an ethylene diamine or piperazine. A polyvalent aromatic group R or R' can be, for example, a phenylene or diphenylene group.

In general, the preferred aminoaliphatic halophenyl sulfides are those where R and R' are each a lower alkyl or a cycloalkyl group, or where R and R' form a ring with the nitrogen atom. Such compounds include for instance the dimethylamino-, diethylamino-, di-n-propylamino-, di-s-butylamino-, cyclohexylmethylamino-, piperidino- and morpholino-aliphatic halophenyl sulfides.

Also useful as rubber additives are the aminoaliphatic halophenyl sulfides where the halophenyl group has a further substituent; this can be, for example, an aliphatic group, for instance an alkyl group, such as methyl or ethyl, or an alkoxy group, for instance methoxy or ethoxy; an aromatic group, for instance an aryl group, such as phenyl or tolyl, or an aryloxy group such as phenoxy; a hydroxy group; an amino group; or a nitro group.

Particularly effective are the aminoaliphatic halophenyl sulfides where the phenyl nucleus is fully substituted; in such instances the halophenyl group can be, for example, a pentahalophenyl group, such as a pentafluorophenyl, pentachlorophenyl or bromotetrachlorophenyl group; an alkyltetrahalophenyl group, such as a methyltetrachlorophenyl group; or a nitrotetrahalophenyl group, such as a nitrotetrachlorophenyl group. Excellent accelerator activity is shown by the aminoaliphatic pentachlorophenyl sulfides.

The new compounds of the invention form a sub-class of the aminoaliphatic halophenyl sulfides that are useful in rubber, where the aminoaliphatic group is an aminomethyl group.

In general, the amino group and the halophenyl group of a new aminomethyl halophenyl sulfide can be selected from the same range of structures as have been described above. Preferably however the amino group is a secondary amino group NRR', where R and R' are each a lower alkyl or a cycloalkyl group, or where R and R' together form a heterocyclic ring with the nitrogen atom, as exemplified above.

Specific examples of the new compounds of the invention are:

dimethylaminomethyl 2,4,6-trichlorophenyl sulfide;
diethylaminomethyl pentachlorophenyl sulfide;
diethylaminomethyl pentafluorophenyl sulfide;

di-n-propylaminomethyl 5-bromo-2,4,6-trichlorophenyl sulfide;
N-cyclohexyl-N-methylaminomethyl pentachlorophenyl sulfide;
diethylaminomethyltetrachloro-p-tolyl sulfide;
piperidinomethyl pentachlorophenyl sulfide;
morpholinomethyl pentachlorophenyl sulfide and
2,6-dimethymorpholinomethyl pentachlorophenyl sulfide.

Examples of other aminoaliphatic aromatic sulfides which can be incorporated in rubber are: 2(diethylamino) ethyl pentachlorophenyl sulfide; 3'-dimethylamino)propyl 2,4,6-trichlorophenyl sulfide and 2-(di-n-butylamino)ethyl pentachlorophenyl sulfide.

In the vulcanization process of the invention, the aminoaliphatic halophenyl sulfides are used as accelerators in conjunction with sulfur, either as elemental sulfur or a sulfur-containing vulcanizing agent such as, for instance, an amine disulfide or a thiuram sulfide.

The process can be applied to the vulcanization of both natural and synthetic rubbers. Synthetic rubbers which can be used include polymers of 1,3-butadienes, for instance 1,3-butadiene itself, and copolymers of 1,3-butadiene with other monomers, such as styrene, acrylonitrile, isobutylene or methyl methacrylate. Typical synthetic rubbers are styrenebutadiene rubber, cis-polybutadiene and cis-polyisoprene. In general sulfur vulcanizable diene rubbers are suitable.

The amount of the accelerator used in the rubber can vary between wide limits, but in general it has been found preferable to use from 0.2 to 4 parts by weight, and particularly from 0.5 to 2.5 parts by weight, per hundred parts by weight of rubber. Amounts somewhat outside these limits can sometimes be employed, for instance from 0.1 to 5 parts of rubber. Very satisfactory results have been obtained using about 2 parts by weight of the aminoaliphatic halophenyl sulfide per hundred parts by weight of rubber.

The accelerator can be incorporated into the rubber using, for example, a roll mill or an internal mixer, together with conventional additives as required, such as for instance zinc oxide, stearic acid, the vulcanizing agent, an antioxidant or a filler. The mixture thus obtained can be vulcanized at an apropriate temperature, for example at a temperature of 130–160° C. where the composition is based on natural rubber, or at a temperature of about 135–165° C. where the composition is based on a styrenebutadiene rubber.

In the process for the production of a new compound of the invention, the reaction of the halothiophenol, amine and formaldehyde is usually effected in the presence of a diluent. This is generally at least in part aqueous; where the diluent or a component of the diluent is non-aqueous, it can be for example an organic liquid which is miscible with water, for instance acetone, ethanol or dioxan.

It is frequently advantageous to introduce one reactant into a pre-formed mixture of the other two. Thus for instanec the amine and the thiophenol can be mixed (often forming an addition compound or salt) and subsequently converted to the required sulfide by treatment with formaldehyde.

In a preferred embodiment of the process, a mixture of the amine and formaldehyde (conveniently employed as an aqueous solution of about 35 to 40% concentration by weight) is first prepared. The thiophenol is then added to this mixture, for example as a solution or suspension in a water-miscible solvent, such as acetone or ethanol.

The reaction temperature employed in the process of the invention generally does not exceed 100° C. Preferably the reactants are mixed at a temperature below about 30° C., although the reaction can be completed at a higher temperature. In the preferred embodiment of the process, the temperature throughout is preferably below about 20° or 25° C.

The invention is illustrated by the following examples.

EXAMPLE 1

This example describes the preparation of the new compound diethylaminomethyl pentachlorophenyl sulfide from pentachlorothiophenol, diethylamine and formaldehyde.

4.1 grams of 37% w./w. aqueous formaldehyde solution (containing 0.05 mol. of formaldehyde) were added to 3.7 grams (0.05 mol.) of diethylamine while stirring and keeping the temperature between 0° and 5° C. To the solution thus obtained there was added, with stirring, a suspension of 14.1 grams (0.05 mol.) of pentachlorothiophenol in 20 cc. of acetone, at a temperature between 5° and 10° C. After stirring for 90 minutes at room temperature, there was obtained 13.5 grams of crude diethylaminomethyl pentachlorophenyl sulfide as a solid which was filtered off and dried. Crystallization from petroleum ether (boiling point 40–60° C.) gave material having a melting point of 60–61° C.

(Found: C, 36.1; H, 3.2; Cl, 47.9; N, 3.9; S, 8.7. $C_{11}H_{12}Cl_5NS$ requires: C, 35.9; H, 3.3; Cl, 48.3; N, 3.8; S, 8.7%.)

EXAMPLE 2

This example describes two methods for the preparation of the new compound piperidinomethyl pentachlorophenyl sulfide.

(a) The first method was similar to that described in Example 1. 16 grams (84% yield) of piperidinomethyl pentachlorophenyl sulfide were obtained from 0.5 mol. each of formaldehyde, piperidine and pentachlorothiophenol. The product was a solid having a melting point of 140–142° C. after crystallization from 60–80 petroleum ether.

(Found: C, 37.2; H, 3.6; Cl, 46.8; N, 3.7; S, 8.6. $C_{12}H_{12}Cl_5NS$ requires: C, 37.9; H, 3.2; Cl, 46.8; N, 3.7; S, 8.5%.)

(b) In the second method, 4.2 grams (0.05 mol.) of piperidine were added to 14.1 grams (0.05 mol.) of pentachlorothiophenol while stirring and keeping the temperature below 20° C. 4.1 grams of a 37% w./w. aqueous solution of foramaldehyde (containing 0.05 mol. of formaldehyde) were then added over a period of 5 minutes. The temperature of the stirred mixture was gradually increased to 80° C. during one hour and then kept at this temperature for a further two hours. After cooling, the product was recrystallized from 60–80 petroleum ether to give piperidinomethyl pentachlorophenyl sulfide having a melting point and mixed melting point identical with that of the product of method (a).

EXAMPLE 3

Morpholinomethyl pentachlorophenyl sulfide was obtained from morpholine, formaldehyde and pentachlorothiophenol by a procedure essentially similar to that of Example 1. The material was a solid having a melting point of 150–152° C.

EXAMPLE 4

2,6-dimethylmorpholinomethyl pentachlorophenyl sulfide was obtained in 70% yield from 0.15 mol. each of 2,6-dimethylmorpholine, formaldehyde and pentachlorothiophenol by a procedure similar to that of Example 1, as a solid having a melting point of 109–110° C. (Found: C, 38.3; H, 3.59; N, 3.5; S, 7.87%. $C_{13}H_{14}Cl_5NOS$ requires C, 38.1; H, 3.42; N, 3.4; S, 7.8%.)

EXAMPLE 5

This example describes the preparation of the new compound 4-hexamethyleniminylmethyl pentachlorophenyl sulfide also named N-(pentachlorophenylthiomethyl)-hexamethyleneimine, from pentachlorothiophenol, hexamethyleneimine and formaldehyde.

20.5 grams of 37% w./w. aqueous formaldehyde solution (containing 0.25 mol. of formaldehyde) were added to 24.8 grams (0.25 mol.) of hexamethyleneimine while stirring and keeping the temperature between 0 and 5° C. To the solution thus obtained there was added at a temperature of 5–10° C., with stirring, a suspension of 70.6 grams (0.25 mol.) of pentachlorothiophenol in 100 cc. of acetone. Cooling was discontinued and the reaction mixture stirred for about two hours at room temperature, filtered, and the solids washed with cold acetone and dried. Recrystallization from ethanol gave material having a melting point of 183–184° C.

EXAMPLE 6

This example describes the tests, involving the vulcanization of samples of rubber, used to ascertain the activity of a test compound as a vulcanization accelerator. The compounds of Examples 1, 2 and 3 were examined in this way, and, for comparison, morpholinomethyl p-chlorophenyl sulfide, an aminoaliphatic halophenyl sulfide having only one halogen atom in the phenyl nucleus, and dibenzothiazyl disulfide (MBTS), a commercial vulcanization accelerator.

A masterbatch of the following composition was compounded on a laboratory mill:

| | Parts by weight |
|---|---|
| Pale crepe rubber | 100.0 |
| Zinc oxide | 3.0 |
| Stearic acid | 1.0 |
| Sulfur | 2.5 |

Each accelerator was milled into a separate portion of the masterbatch in the proportion by weight of 2 parts per 100 parts of rubber. A further portion of the masterbatch was used as a control.

Each stock was allowed to stand for 24 hours before being tested.

Two test methods were employed. In the first a 50 gram sample of the stock was placed in a Mooney plastometer fitted with a "large" rotor, according to British Standard Specification No. 1673, Part 3, 1951, and the time taken for the reading of the instrument to increase to 100 units at a temperature of 140° ±1° C. was recorded.

In the second, the degree of vulcanization of a stock after various cure times at 160° C. was determined by measuring the extent to which a cured sample was swollen by immersion in benzene for 24 hours at room temperature, the extent of swelling being inversely proportional to the degrees of vulcanization. The procedure was that of British Standard Specification 903, Part A16, Method C, using strips cured in 1 mm. x ½ inch x 4 inch moulds.

The results given in the table below show the high activities of the aminomethyl pentachlorophenyl sulfides but that morpholinylmethyl p-chlorophenyl sulfide, although showing some activity in the first test method, was inactive in the second.

TABLE I

| Accelerator | Mooney Plastometer Time to reach 100 units (mins.) | Percent Linear Swelling in Benzene | | | |
|---|---|---|---|---|---|
| | | Cure Time (minutes) | | | |
| | | 7.5 | 15 | 30 | 60 |
| Diethylaminomethylpentachlorophenyl sulfide | 16¼ | 76 | 72 | 73 | 80 |
| Piperidinomethyl pentachlorophenyl sulfide | 13 | 73 | 74 | 76 | 79 |
| Morpholinomethyl pentachlorophenyl sulfide | 28 | 91 | 80 | 78 | 83 |
| Morpholinomethyl p-chlorophenyl sulfide | 30¼ | 149 | | | |
| MBTS | 22 | 71 | 74 | 76 | 78 |
| None (control) | 120 | | 120 | 110 | 107 |

Absence of figures for benzene swelling indicates a very low cure with swelling greater than 150%.

EXAMPLE 7

This example describes further tests involving vulcanization of rubber samples to ascertain activity as vulcanization accelerator. The compounds of Examples 3 and 6 were examined in this way and compared to the commercial accelerator dibenzothiazyl disulfide (MBTS).

A masterbatch of the composition described in Example 6 was compounded on a laboratory mill. Each accelerator was milled into a separate proportion of the masterbatch in a proportion of 2 parts per 100 parts of rubber in the case of experimental accelerators and 1 part per 100 parts of rubber of MBTS. A further portion of the masterbatch was used as a control. Each stock was vulcanized by heating in the usual manner in a press for different periods of time at 160° C. The results given in the table below show the high activities of the new accelerators:

TABLE II

| | Cure Time in Mins. | Accelerator Added | | | |
|---|---|---|---|---|---|
| | | None | MBTS | Example 3 | Example 5 |
| Modulus of Elasticity in lbs./in.² at 300% Elongation | 15 | 40 | 160 | 100 | 260 |
| | 30 | 60 | 160 | 160 | 260 |
| | 60 | 73 | 160 | 160 | 150 |
| Ultimate Tensile Strength, lbs./in.² | 15 | 44 | 2,520 | 2,000 | 3,030 |
| | 30 | 396 | 2,050 | 2,260 | 2,810 |
| | 60 | 970 | 1,920 | 2,000 | 2,750 |
| Ultimate Elongation, Percent | 15 | 400 | 900 | 870 | 770 |
| | 30 | 900 | 850 | 800 | 730 |
| | 60 | 950 | 870 | 810 | 800 |

It is intended to cover all changes and modifications of the examples of the invention herein chosen for purposes of disclosure which do not constitute departures from the spirit and scope of the invention.

What is claimed is:

1. A process of vulcanizing rubber which comprises heating at vulvanizing temperature rubber having incorporated therein sulfur and an accelerating amount of an aminoalkyl halophenyl sulfide in which the phenyl nucleus contains three to five halogen atoms and in which the amino group is a secondary amino group —NHR or a tertiary amino group —NRR′, wherein the R and R′ in the secondary or tertiary amino group can be aliphatic or aromatic or, in the tertiary amino group, R and R′ can form a ring with the nitrogen atom.

2. A process of vulcanizing rubber which comprises heating at vulcanizing temperature rubber having incorporated therein sulfur and an accelerating amount of the compound of the formula

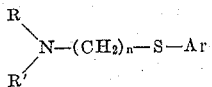

where R and R' are lower alkyl, $n$ is an integer at least one but not more than two and Ar is chlorophenyl containing three to five chlorine atoms.

3. A process of vulcanizing rubber which comprises heating a vulcanizing temperature rubber having incorporated therein sulfur and an accelerating amount of the compound of the formula

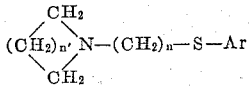

where $n'$ is an integer at least two but not more than four, $n$ is an integer at least one but not more than two, and Ar is chlorophenyl containing three to five chlorine atoms.

4. A process of vulcanizing rubber which comprises heating a vulcanizing temperature rubber having incorporated therein sulfur and an accelerating amount of the compound of the formula

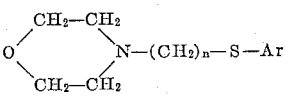

where $n$ is an integer at least one but not more than two and Ar is chlorophenyl containing three to five chlorine atoms.

5. A process of vulcanizing rubber which comprises heating at vulcanizing temperature rubber having incorporated therein sulfur and an accelerating amount of diethylaminomethyl pentachlorophenyl sulfide.

6. A process of vulcanizing rubber which comprises heating at vulcanizing temperature rubber having incorporated therein sulfur and an accelerating amount of piperidinomethyl pentachlorophenyl sulfide.

7. A process of vulcanizing rubber which comprises heating at vulcanizing temperature rubber having incorporated therein sulfur and an accelerating amount of morpholinomethyl pentachlorophenyl sulfide.

8. A process of vulcanizing rubber which comprises heating at vulcanizing temperature rubber having incorporated therein sulfur and an accelerating amount of N-(pentachlorophenylthiomethyl)hexamethylenimine.

References Cited by the Examiner

UNITED STATES PATENTS

| | | | |
|---|---|---|---|
| 2,187,719 | 1/1940 | Williams | 260—239 |
| 2,483,436 | 10/1949 | Rieveschl | 260—570 |
| 2,753,345 | 7/1956 | Wright | 260—247.1 |
| 2,973,354 | 2/1961 | Werner | 260—239 |
| 3,036,050 | 5/1962 | D'Amico | 260—79.5 |
| 3,047,546 | 7/1962 | Lober et al. | 260—79.5 |

OTHER REFERENCES

Short, J. H., Journal of Org. Chem., vol. 26, pp. 2596–7, May–August 1961.

JOSEPH L. SCHOFER, *Primary Examiner.*

M. P. HENDRICKSON, D. K. DENENBERG,
*Assistant Examiners.*